United States Patent [19]

Hayes et al.

[11] Patent Number: 5,844,070

[45] Date of Patent: Dec. 1, 1998

[54] PROCESS FOR RAPID ACTIVATION OF DOUBLE METAL CYANIDE CATALYSTS

[75] Inventors: John E. Hayes, Gouvieux, France; Leah J. Langsdorf, West Chester, Pa.; Bruce H. Isaacs, Media, Pa.; Fred J. Armellini, Willow Grove, Pa.

[73] Assignee: Arco Chemical Technology, L.P., Greenville, Del.

[21] Appl. No.: 857,998

[22] Filed: May 16, 1997

[51] Int. Cl.⁶ .............................. C08F 6/00; C08G 59/68; C08G 65/04; C08J 3/00

[52] U.S. Cl. ........................ 528/501; 528/92; 528/414; 528/483; 528/485; 528/491; 528/492; 528/493; 528/494; 528/495; 528/496; 528/497; 528/498; 521/92; 521/123; 568/867; 568/868; 525/403; 525/404; 525/407; 525/409; 525/474; 525/476; 525/479

[58] Field of Search .............................. 528/92, 414, 483, 528/485, 491, 492, 493, 494, 495, 496, 497, 498, 501; 521/92, 123; 568/867, 868; 525/403, 404, 407, 409, 474, 476, 479

[56] References Cited

U.S. PATENT DOCUMENTS

| | | |
|---|---|---|
| 3,278,457 | 10/1966 | Milgrom ..................................... 260/2 |
| 3,278,459 | 10/1966 | Herold ........................................ 260/2 |
| 3,829,505 | 8/1974 | Herold .................................... 260/611 |
| 3,941,849 | 3/1976 | Herold .................................... 260/607 |
| 4,472,560 | 9/1984 | Kuyper et al. .......................... 526/120 |
| 5,110,970 | 5/1992 | Blevins, II et al. .................... 556/445 |
| 5,158,922 | 10/1992 | Hinney et al. .......................... 502/175 |
| 5,426,081 | 6/1995 | Le-Khac .................................. 502/154 |
| 5,470,813 | 11/1995 | Le-Khac .................................. 502/175 |
| 5,482,908 | 1/1996 | Le-Khac .................................. 502/156 |
| 5,489,617 | 2/1996 | Miller et al. ............................ 521/112 |
| 5,525,640 | 6/1996 | Gerkin et al. ........................... 521/112 |

*Primary Examiner*—Frederick Krass
*Attorney, Agent, or Firm*—Jonathan L. Schuchardt

[57] ABSTRACT

A process for activating double metal cyanide catalysts is disclosed. A polyol starter or starter/catalyst mixture is heated under vacuum under conditions effective to achieve improved stripping compared with that which can be achieved through conventional vacuum stripping. Coupling vacuum stripping with inert gas sparging or stripping in the presence of an organic solvent gives a starter/catalyst mixture that activates rapidly in an epoxide polymerization process. Rapid activation makes process start-ups reliable and reduces cycle time. The process gives polyols with lower viscosity, lower polydispersity, and lower unsaturation for better polyurethanes.

19 Claims, No Drawings

PROCESS FOR RAPID ACTIVATION OF DOUBLE METAL CYANIDE CATALYSTS

FIELD OF THE INVENTION

The invention relates to double metal cyanide (DMC) catalysts. In particular, the invention relates to a process for stripping polyol starters or mixtures of a polyol starter and a DMC catalyst to prepare them for use in an epoxide polymerization reaction. Improved stripping results in rapid catalyst activation and/or improved polyols and polyurethanes.

BACKGROUND OF THE INVENTION

Double metal cyanide (DMC) complexes are well-known catalysts for epoxide polymerization and synthesis of polyether polyols. The catalysts were discovered in the 1960s (see, e.g., U.S. Pat. Nos. 3,278,459 and 3,829,505). Recent improvements have made DMC catalysts much more attractive for commercial manufacture of polyether polyols (see, e.g., U.S. Pat. Nos. 5,158,922, 5,426,081, 5,470,813, and 5,482,908). Compared with conventional KOH catalysts, DMC catalysts give fast epoxide polymerizations, so cycle times for polyol manufacture can be reduced. In addition, DMC catalysts give high-quality polyether polyol products that have low unsaturation, narrow molecular weight distribution, and low viscosity.

While DMC catalysts offer significant advantages, even the best DMC catalysts have some drawbacks. For example, unlike KOH, DMC catalysts must normally be activated before the epoxide can be added continuously to the reactor. Usually, a polyol starter and a DMC catalyst are combined and heated under vacuum prior to the addition of a small proportion of epoxide. Catalyst activation is inferred from a drop in epoxide partial pressure in the reactor. At typical epoxide/starter charges of 5–15 wt.%, initiation times (defined as the time required for a 50% decrease in epoxide partial pressure) can range from several minutes to several hours. Long initiation times increase cycle time, which undercuts the economic advantage of faster polymerizations. In addition, heating the catalyst for a prolonged period at high temperature can reduce its activity or deactivate it completely.

Initiation time can be reduced by increasing epoxide concentration. However, higher initial epoxide concentrations can generate uncontrolled exotherms: a potential safety hazard. Temperature excursions can also negatively impact polyol quality (e.g., higher viscosity, broader molecular weight distribution). Increasing reaction temperature also reduces initiation time. However, reaction temperature can only be increased marginally without having adverse effects on polyol quality.

In sum, an improved way to activate DMC catalysts is needed. Preferably, the process would be simple to practice with inexpensive, readily available equipment and supplies. A preferred process would offer polyol makers that use DMC catalysts more control over initiation of epoxide polymerizations. A valuable process would activate catalysts within minutes (rather than hours) and would permit use of low starting concentrations of epoxides. A valuable process would give polyether polyols that have low viscosity, low polydispersity, and low unsaturation. Ideally, the resulting polyols would give improved polyurethane foams, sealants, elastomers, adhesives, and coatings.

SUMMARY OF THE INVENTION

The invention is a process for stripping polyol starters or mixtures of a polyol starter and a double metal cyanide (DMC) catalyst. In one process, a polyol starter is first combined and mixed with a DMC catalyst. The starter/catalyst mixture is then heated under vacuum under conditions effective to achieve improved stripping compared with that which can be achieved through conventional vacuum stripping. Preferred conditions include vacuum stripping while sparging the mixture with an inert gas and vacuum stripping in the presence of an organic solvent. Alternatively, a polyol starter is vacuum stripped in the absence of a catalyst under conditions effective to achieve improved stripping, and the starter is combined with a DMC catalyst later.

We surprisingly found that stripping starters and starter/catalyst mixtures as described above offers substantial advantages to polyol manufacturers. First, the starter/catalyst mixtures generally activate more rapidly (within minutes) in an epoxide polymerization process compared with a starter/catalyst mixture that is simply vacuum stripped in the conventional way. Thus, the process makes start-ups reliable without prolonging cycle time. We also found that polyols made by the process have improved properties, including lower viscosity, lower polydispersity, and lower unsaturation compared with polyols made by a process that uses conventional vacuum stripping alone. Finally, we found that improving starter/catalyst stripping can even improve properties of polyurethanes made from the polyols.

DETAILED DESCRIPTION OF THE INVENTION

The process of the invention comprises heating polyol starters or starter/catalyst mixtures under vacuum under conditions effective to achieve improved stripping compared with that which can be achieved through conventional vacuum stripping.

Polyol starters contain one or more active hydrogen groups (—OH, —NH$_2$, etc.) and are capable of starting epoxide polymerizations. Polyol starters have a lower molecular weight than the desired reaction product. Preferably, the starter has a number average molecular weight of at least about 200 and contains one or more hydroxyl end groups. Preferred polyol starters have average hydroxyl functionalities from about 1 to about 8. Compounds suitable as polyol starters are well known to those skilled in the art. Examples include tripropylene glycol, polyoxyalkylene glycols, polytetramethylene ether glycols, propoxylated glycerol, alkoxylated allylic alcohols, and the like, and mixtures thereof. Other examples of suitable polyol starters are listed, for example, in U.S. Pat. No. 5,158,922, the teachings of which are incorporated herein by reference.

The process of the invention is valuable for activating catalyst/starter mixtures in which the starter is an alkoxylated allylic alcohol, particularly a propoxylated allyl alcohol having from one to five oxypropylene units. These starters are often difficult to activate otherwise. Alkoxylated allylic alcohols, including high molecular weight (>2000) propoxylated allyl alcohols, are valuable intermediates for making silicone surfactants. Many of these surfactants have a hydrophobic silicone backbone and more hydrophilic polyether side chains attached by Si-C bonds. These "comb" polymers are made by grafting one or more alkoxylated allylic alcohols onto a silicone backbone using a transition metal catalyst. Examples appear in U.S. Pat. Nos. 5,525,640, 5,489,617, and 5,110,970, the teachings of which are incorporated herein by reference.

The process of the invention is used to activate double metal cyanide (DMC) catalysts. DMC catalysts are a well-known class of epoxide polymerization catalysts. Suitable DMC catalysts and methods of making them are described, for example, in U.S. Pat. Nos. 3,278,457, 3,829,505, 3,941, 849, 4,472,560, 5,158,922, 5,470,813, 5,482,908, the teachings of which are incorporated herein by reference. Generally, aqueous solutions of a metal salt (e.g., zinc chloride) and a metal cyanide salt (e.g., potassium hexacyanocobaltate) are combined in the presence of an organic complexing agent (e.g., glyme, t-butyl alcohol) to produce a precipitate of the DMC complex. Zinc hexacyanocobaltates are particularly preferred.

Any DMC catalyst can be activated by the process of the invention, including, for example, the original DMC-glyme catalysts (see, e.g., U.S. Pat. Nos. 3,278,457, 3,829,505, 3,941,849, 4,472,560), newer DMC catalysts that are substantially non-crystalline (see, e.g., U.S. Pat. Nos. 5,470,813 and 5,482,908), DMC catalysts that incorporate about 2–80 wt.% of a polyether or other functionalized polymer such as polyacrylamides (see, e.g., U.S. Pat. No. 5,482,908 and Ser. No. 08/731,495), now U.S. Pat No. 5,714,428. ("Functionalized polymers" contain one or more functional groups containing oxygen, nitrogen, sulfur, phosphorus, or halogen, wherein the polymer, or a water-soluble salt derived from it, has relatively good water solubility, i.e., at least about 3 wt.% of the polymer or its salt dissolves at room temperature in water or mixtures of water with a water-miscible organic solvent.) The process of the invention is suitable for use with various forms of DMC catalysts, including powders, pastes (see, e.g., Ser. No. 08/588,751), now U.S. Pat. No. 5,639,705, or suspensions (see U.S. Pat. No. 4,472,560). The process of the invention can be used to activate DMC catalysts used in batch, semi-batch, and continuous processes, and also to activate catalysts used in processes that involve continuous addition of some or all of the starter during polymerization.

The polyol starter or mixture of starter and DMC catalyst is heated and stripped under vacuum under conditions effective to achieve improved stripping compared with that which can be achieved through conventional vacuum stripping. Improved stripping compared with conventional vacuum stripping can be achieved in any desired way. Preferred approaches include inert gas sparging combined with vacuum stripping, wiped-film evaporation, vacuum stripping in the presence of an organic solvent, and the like. We surprisingly found that improved stripping of starters and starter/catalyst mixtures results in rapid catalyst activation and production of high-quality polyols.

The temperature at which the stripping is performed is not critical. Preferably, however, the stripping is performed at a temperature within the range of about 60° C. to about 200° C.; a more preferred range is from about 80° C. to about 150° C. The stripping is performed at reduced pressure (less than 760 mm Hg). Preferably, the stripping is performed at reactor pressures less than about 300 mm; more preferred are pressures less than about 200 mm.

The polyol starter can be stripped before adding the DMC catalyst. We found that reducing the water content of starters by improved stripping offers faster catalyst activation and better polyols. Preferably, the water content of the starter is reduced to less than about 100 ppm; more preferably, the water content of the stripped starter is less than about 50 ppm. Water content of polyol starters can also be reduced by other methods known to those skilled in the art, including, for example, by adding in-situ drying agents (e.g., magnesium sulfate, molecular sieves).

While the polyol starter can be stripped before adding the DMC catalyst, it is generally preferred to perform the stripping step with both starter polyol and DMC catalyst present. As Example 10 and Comparative Example 11 below illustrate, catalyst activation is usually much faster if both starter and catalyst are present during vacuum stripping.

During vacuum stripping, the starter or starter/catalyst mixture can be sparged with an inert gas. Preferably, the sparging is performed in a manner effective to produce a starter/catalyst mixture that activates rapidly in an epoxide polymerization. Suitable inert gases are those that can assist in removal of volatile impurities from starter/catalyst mixtures yet do not react with the starter or poison the DMC catalyst. Suitable inert gases include, for example, nitrogen, air (preferably dry air), carbon dioxide, argon, helium, and the like, and mixtures thereof. Sparging is normally performed by injecting the gas at one or more locations below the surface of the starter/catalyst mixture. An aerating device can be used to further distribute the gas. The flow rate of the inert gas is adjusted to produce maximum catalyst activation. Generally, a flow rate within the range of about 0.001 to about 0.1 pounds of gas per hour per pound of starter is preferred.

The degree of improvement conferred by improved stripping depends on many factors, including, for example, the initial water content of the starter polyol, the amount and type of catalyst, the nature of the starter, and the polyol product molecular weight. The particular stripping conditions used are also important: the temperature, vacuum level, amount of inert gas used, and stripping time are adjusted to maximize efficiency in activating the starter/catalyst mixture and/or producing better polyols.

Starter/catalyst mixtures prepared by the process of the invention activate more rapidly in an epoxide polymerization process compared with starter/catalyst mixtures that are merely vacuum stripped in the conventional way. In fact, as the Examples in Tables 1–3 demonstrate, the catalysts have initial activities that are typically 5 to 20 times greater (compare the initial $K_{app}$ values in Table 2) and initiation times that are usually 2 or 3 times shorter (see Tables 1 and 3).

Rapid activation has added advantages. Catalyst initiation is safer and more predictable when initial activity is high. In addition, because the starter/catalyst mixture can usually be activated during initial heating, cycle time is minimized. Fast activation also permits a faster epoxide feed ramp, less accumulation of unreacted epoxide in the reactor, and a greatly reduced risk of unwanted temperature excursions. Such temperature excursions contribute to operational glitches and poor product quality.

It is generally preferred to activate the starter/catalyst mixture by inert-gas sparging, but any other method can be used that provides a greater degree of stripping than is possible using conventional vacuum stripping. A second preferred approach is to vacuum strip the mixture in the presence of an organic solvent. Suitable solvents are those that assist in removing volatile impurities from the mixture without reacting with the starter or poisoning the catalyst. Suitable organic solvents include, for example, ethers (including tetrahydrofuran and propylene oxide), esters, ketones, alcohols, hydrocarbons, halogenated hydrocarbons, and the like, and mixtures thereof. The solvent can be added to the starter/catalyst mixture in one portion, multiple portions, or it can be introduced continuously during the vacuum stripping process. Preferably, the organic solvent is recovered, purified, and reused in the process. The amount of solvent used is that which is effective to produce a catalyst/starter mixture that will activate more rapidly in an epoxide polymerization process compared with starter/catalyst mixtures that are not vacuum stripped in the presence of an organic solvent.

One process of the invention comprises polymerizing one or more epoxides in the presence of the stripped starter/catalyst mixture to make a polyether polyol. Methods for making epoxide polymers using DMC catalysts are described completely in U.S. Pat. Nos. 3,829,505, 3,941,849, 5,158,922, 5,470,813, and 5,482,908, the teachings of which are incorporated herein by reference. Suitable epoxides include, for example, ethylene oxide, propylene oxide, butene oxides, styrene oxide, and the like, and mixtures thereof. The process can be used to make random or block copolymers.

Effective stripping improves polyol quality. Polyether polyols produced using the starter/catalyst mixtures have lower unsaturation, lower polydispersity (narrower molecular weight distribution), and lower viscosity compared with polyols made without activating the starter/catalyst mixture by the process of the invention. Low viscosity and low polydispersity make the polyol easier to process in downstream applications. Low unsaturation (low monol content) means a polyol with truer hydroxyl functionality and polyurethanes with improved physical properties (e.g., tensile strength, tear strength, compression set).

Polyether polyols made by the process of the invention are valuable for making polyurethane foams, coatings, sealants, adhesives, and elastomers with improved properties. Molded flexible foams made from the polyols, for example, have cells that are more easily broken open by crushing compared with foams made using polyols not made by the process of the invention. As Example 28 shows, the foams have reduced force-to-crush ratios, which indicates high quality and good comfort.

The following examples merely illustrate the invention. Those skilled in the art will recognize many variations that are within the spirit of the invention and scope of the claims.

EXAMPLES 1–12

Effect of Improved Stripping on Catalyst Activation

These examples show that using an inert gas in combination with vacuum stripping is more effective than either conventional vacuum stripping or no stripping at all for activating double metal cyanide catalysts. The process of the invention is well-suited for activating the variety of DMC catalysts described in the art. For example, the process works with various complexing agents in the catalyst (glyme, t-butyl alcohol) and with polyether-containing catalysts. The process also works with both powder and paste forms of the catalyst. Results appear in Table 1.

EXAMPLES 13–16

Effect of Improved Stripping on Initial Catalyst Activity

As the results in Table 2 show, stripping under vacuum with a nitrogen sparge has a dramatic impact on initial catalyst activity. The effect is nearly identical with either a 400 mol. wt. diol or 700 mol. wt. triol starter.

EXAMPLES 17–27

Effect of Improved Stripping on Polyol Properties

These examples show that using an inert gas in combination with vacuum stripping gives polyols with improved physical properties compared with polyols made in a process that uses either conventional vacuum stripping or no stripping at all. As the results in Table 3 show, vacuum stripping assisted by a nitrogen sparge results in faster catalyst initiation, lower polyol viscosity, narrower molecular weight distribution ($M_w M_n$), and lower unsaturation.

EXAMPLE 28

Effect of Improved Stripping on Flexible Polyurethane Foam Properties

Flexible foams are prepared from TDI prepolymers as is described in Appl. Ser. No. 08/544,629, filed Oct. 18, 1995, now U.S. Pat. No. 5,650,452. The TDI prepolymers are made by reacting one mole of TDI for each mole of polyol hydroxyl groups. The only difference is that Polyol A is made from a starter/DMC catalyst mixture that is vacuum stripped at 50 mm without any gas sparging prior to making the polyol, and Polyol B is made from a starter/DMC catalyst mixture that is vacuum stripped at 140 mm while being sparged with nitrogen at 01 pounds per hour of nitrogen per pound of starter. The foam made Polyol A has foam force-to-crush values of 376/236/182 for cycles 1–3.

TABLE 1

Effect of Improved Stripping on Catalyst Activation

| Ex # | Catalyst[1] | Amt.[2] (ppm) | Triol starter mw | Stripping conditions[3] | Initiation[4] time (min) |
|---|---|---|---|---|---|
| 1 | A | 177 | 450 | vacuum/nitrogen | 5 |
| C2 | A | 177 | 450 | vacuum only | 46 |
| 3 | A | 113 | 700 | vacuum/nitrogen | 2 |
| 4 | A | 113 | 700 | vacuum/air | 5 |
| C5 | A | 113 | 700 | vacuum only | 22 |
| 6 | B | 1143 | 700 | vacuum/nitrogen | 12 |
| C7 | B | 1143 | 700 | vacuum only | 16 |
| 8 | C | 114 | 700 | vacuum/nitrogen | 14 |
| C9 | C | 114 | 700 | none | >80 |
| 10 | D | 113 | 700 | vacuum/nitrogen | 30 |
| C11 | D | 113 | 700 | vacuum/nitrogen[5] | 105 |
| C12 | D | 113 | 760 | vacuum only | 65 |

[1]Zinc hexacyanocobaltate catalysts:
A = t-butyl alcohol complex, paste, (30% solids), prepared as in Ser. No. 08/588,751.
B = glyme complex, powder, prepared as in U.S. Pat. No. 5,158,922.
C = t-butyl alcohol/1K poly(PO) diol complex, prepared as in U.S. Pat. No. 5,482,908, now USP 5,639,705.
D = t-butyl alcohol complex, powder, prepared as in U.S. Pat. No. 5,470,813.
[2]Concentration in polyol starter on a solids weight basis.
[3]Both catalyst and starter are stripped under vacuum at 130° C.
[4]Time needed for a 50% drop in initial pressure.
[5]Starter only is stripped.

TABLE 2

Effect of Improved Stripping on Initial Catalyst Activity

| Ex # | Catalyst[1] | Amt.[2] (ppm) | Starter | Stripping conditions[3] | Initial $K_{appl}$[4] ($min^{-1}$) |
|---|---|---|---|---|---|
| 13 | C | 114 | 400 mw diol | vacuum/nitrogen | 0.30 |
| C14 | C | 114 | 400 mw diol | none | 0.058 |
| 15 | C | 114 | 700 mw triol | vacuum/nitrogen | 0.28 |
| C16 | C | 114 | 700 mw triol | none | 0.069 |

[1]Zinc hexacyanocobaltate catalyst "C" is a t-butyl alcohol/1K poly(PO) diol complex, prepared as in U.S. Pat. No. 5,482,908.
[2]Concentration in polyol starter on a solids weight basis.
[3]Both catalyst and starter are stripped under vacuum at 130° C.
[4]Rate constant as measured from a straight-line plot of exponential decay in partial pressure of propylene oxide as a function of time.

The foam from Polyol B has foam force-to-crush values of 349/122/95 for cycles 1–3.

The results demonstrate that a higher-quality foam is available from polyols made from starter/catalyst mixtures that are stripped according to the process of the invention.

TABLE 3

Effect of Stripping on Polyol Properties[1]

| Ex # | Product | Stripping conditions[2] | PO press. (psia) | Initiation time (min) | Viscosity (cps) | $M_w/M_n$ | Unsat. (meq/g) |
|---|---|---|---|---|---|---|---|
| 17  | 4K diol  | vac/nitrogen | 25 | 11   | 944  | 1.15 | 0.0039 |
| 18  | 4K diol  | vac/nitrogen | 15 | 12   | 912  | 1.13 | 0.0039 |
| C19 | 4K diol  | vac only     | 25 | 79   | 1010 | 1.30 | 0.0049 |
| C20 | 4K diol  | none         | 25 | >100 | 1124 | 1.44 | 0.0051 |
| C21 | 4K diol  | none         | 25 | 45   | 1033 | 1.35 | 0.0047 |
| 22  | 6K triol | vac/nitrogen | 25 | 5    | 1372 | 1.10 | 0.0041 |
| 23  | 6K triol | vac/nitrogen | 12 | 6    | 1357 | 1.05 | 0.0040 |
| C24 | 6K triol | none         | 25 | 49   | 1554 | 1.19 | 0.0045 |
| C25 | 6K triol | none         | 40 | 25   | 1540 | 1.15 | 0.0042 |
| 26  | 3K triol | vac/nitrogen | 25 | 2    | 615  | 1.07 | 0.0037 |
| C27 | 3K triol | none         | 25 | 46   | 656  | 1.17 | 0.0038 |

[1]Zinc hexacyanocobaltate catalyst used is "D", a t-butyl alcohol complex, prepared as in U.S. Pat. No. 5,470,813, used at 25 ppm in the final polyol.
[2]Both catalyst and starter are stripped under vacuum at 130° C.

The preceding examples are meant only as illustrations; the following claims define the scope of the invention.

We claim:

1. A process which comprises:
    (a) mixing a polyol starter with a double metal cyanide catalyst; and
    (b) heating the starter/catalyst mixture under vacuum under conditions effective to achieve increased stripping compared with that which can be achieved through vacuum stripping alone, such that catalyst activity and/or initiation time is decreased.

2. The process of claim 1 wherein the starter/catalyst mixture is heated under vacuum while sparging the mixture with an inert gas.

3. The process of claim 2 wherein the inert gas is selected from the group consisting of nitrogen, air, carbon dioxide, argon, helium, and mixtures thereof.

4. The process of claim 2 wherein the starter/catalyst mixture activates at least about 3 times faster in an epoxide polymerization process compared with a starter/catalyst mixture that is not sparged with an inert gas.

5. The process of claim 1 wherein the starter/catalyst mixture is heated under vacuum while stripping the mixture in the presence of an organic solvent.

6. The process of claim 5 wherein the organic solvent is selected from the group consisting of ethers, esters, ketones, alcohols, hydrocarbons, halogenated hydrocarbons, and mixtures thereof.

7. The process of claim 1 wherein the polyol starter is selected from the group consisting of tripropylene glycol, polyoxyalkylene glycols, polytetramethylene ether glycols, propoxylated glycerol, alkoxylated allylic alcohols, and mixtures thereof.

8. The process of claim 1 wherein the catalyst is a zinc hexacyanocobaltate.

9. The process of claim 1 wherein the catalyst is substantially non-crystalline.

10. The process of claim 1 wherein the starter/catalyst mixture is heated at a temperature within the range of about 60° C. to about 200° C. and under a vacuum of less than about 300 mm Hg.

11. The process of claim 1 further comprising polymerizing an epoxide in the presence of the stripped starter/catalyst mixture to produce a polyether polyol.

12. The process of claim 11 further comprising using the polyether polyol to make a flexible polyurethane foam.

13. A process which comprises:
    (a) mixing a polyol starter with a zinc hexacyanocobaltate catalyst; and
    (b) heating the starter/catalyst mixture at a temperature within the range of about 60° C. to about 200° C. and under a vacuum of less than about 300 mm Hg while sparging the mixture with an inert gas.

14. The process of claim 13 wherein the inert gas is selected from the group consisting of nitrogen, air, carbon dioxide, argon, helium, and mixtures thereof.

15. The process of claim 13 wherein wherein the polyol starter is selected from the group consisting of tripropylene glycol, polyoxyalkylene glycols, polytetramethylene ether glycols, propoxylated glycerol, alkoxylated allylic alcohols, and mixtures thereof.

16. The process of claim 13 wherein the starter/catalyst mixture activates at least about 3 times faster in an epoxide polymerization process compared with a starter/catalyst mixture that is not sparged with an inert gas.

17. A process which comprises:
    (a) mixing a polyol starter with a zinc hexacyanocobaltate catalyst; and
    (b) heating the starter/catalyst mixture at a temperature within the range of about 60° C. to about 200° C. and under a vacuum of less than about 300 mm Hg while while stripping the mixture in the presence of an organic solvent.

18. The process of claim 17 wherein the organic solvent is selected from the group consisting of ethers, esters, ketones, alcohols, hydrocarbons, halogenated hydrocarbons, and mixtures thereof.

19. The process of claim 17 wherein wherein the polyol starter is selected from the group consisting of tripropylene glycol, polyoxyalkylene glycols, polytetramethylene ether glycols, propoxylated glycerol, alkoxylated allylic alcohols, and mixtures thereof.

* * * * *